US012018527B2

(12) United States Patent
Murray

(10) Patent No.: US 12,018,527 B2
(45) Date of Patent: Jun. 25, 2024

(54) AUTOMATIC TENSIONING SIDE TRACK ASSEMBLY FOR AN OPERABLE SCREEN

(71) Applicant: Michael Murray, Jacksonville, FL (US)

(72) Inventor: Michael Murray, Jacksonville, FL (US)

(*) Notice: Subject to any disclaimer, the term of this patent is extended or adjusted under 35 U.S.C. 154(b) by 0 days.

(21) Appl. No.: 18/327,414

(22) Filed: Jun. 1, 2023

(65) Prior Publication Data

US 2024/0151104 A1 May 9, 2024

Related U.S. Application Data

(60) Provisional application No. 63/382,782, filed on Nov. 8, 2022.

(51) Int. Cl.
*E06B 9/58* (2006.01)
*E06B 9/42* (2006.01)

(52) U.S. Cl.
CPC ................ *E06B 9/581* (2013.01); *E06B 9/42* (2013.01); *E06B 2009/587* (2013.01)

(58) Field of Classification Search
CPC ....... E06B 9/581; E06B 2009/587; E06B 9/42
See application file for complete search history.

(56) References Cited

U.S. PATENT DOCUMENTS

| | | | | |
|---|---|---|---|---|
| 7,793,702 | B2 * | 9/2010 | Biewer | B60J 7/0015 296/214 |
| 8,607,841 | B2 * | 12/2013 | Hayashiguchi | E06B 9/581 160/273.1 |
| 9,719,292 | B1 | 8/2017 | James et al. | |
| 10,036,198 | B2 | 7/2018 | James et al. | |
| 10,260,279 | B2 * | 4/2019 | Nakae | E06B 9/40 |
| 11,326,395 | B2 * | 5/2022 | Heissenberg | E06B 9/58 |
| 11,421,474 | B2 | 8/2022 | James et al. | |
| 2015/0041076 | A1 * | 2/2015 | Andre de la Porte | E06B 9/581 160/266 |

* cited by examiner

*Primary Examiner* — Beth A Stephan
(74) *Attorney, Agent, or Firm* — Ashkan Najafi

(57) ABSTRACT

An automatic tensioning side track assembly includes a stationary base track, a dynamic screen receiver, a first magnet, a second magnet, and a screen. The first magnet is oppositely charged relative to the second magnet and is configured to maintain an attractive magnetic force with the second magnet. The first magnet is disposed at a first position associated with a first rectilinear horizontal distance away from the second magnet when the screen is at a substantially planar configuration and has a desired tensioned state. The first magnet is disposed at a second position associated with a second rectilinear horizontal distance away from the second magnet when the screen is at a substantially bowed configuration and has an undesired tensioned state. The first magnet is configured to automatically return from the second position to the first position after the screen is displaced to the substantially bowed configuration.

11 Claims, 13 Drawing Sheets

AUTOMATIC TENSIONING SIDE TRACK ASSEMBLY FOR AN OPERABLE SCREEN

CROSS REFERENCE TO RELATED APPLICATIONS

This is a non-provisional patent application that claims priority to and benefit of U.S. provisional patent application No. 63/382,782 filed Nov. 8, 2022, which is incorporated by reference herein in its entirety.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND

Technical Field

Exemplary embodiment(s) of the present disclosure relate to retractable screen assemblies and, more particularly, to an automatic tensioning side track assembly for maintaining a retractable screen of a retractable screen enclosure (e.g., patio) assembly at a desired tensioned state while external shear and tension forces are exerted against the retractable screen during ambient weather conditions and repetitive use over extended time periods.

Prior Art

Protective screens are typically motorized such that the operator presses a button on a remote control causing the screens to raise or lower within a framework that is attached to the building. Typically, an operable screen system is comprised of several principal components made up of sub-assemblies. First, there is generally a take up box for the screen, which may be called a hood assembly and is a horizontally mounted enclosure box with a screen take-up reel inside and a motor within the reel to drive the reel. Second, there are tracks running along the sides of the opening that engage the screen edges such that the screen edges are held captive but also able to slide up and down easily within the track. Third is a weighted bar on the bottom of a screen. The weighted bar is attached to the screen bottom edge and assists with pulling the screen down through gravitational force when the motor is operated in a reverse direction from the lift direction. These three components make up the frame for the operable screen assembly. The last element of an operable screen system is the screen itself. The screen is attached to the reel which acts as a storage mechanism and the screen edges are engaged with the side tracks to prevent the screen edges from pulling out of the tracks.

Unfortunately, over time and extended use, the screen is exposed to external shear and tension forces caused by objects, wind, repeated use, etc. Such external shear and tension forces may stretch the screen and cause a baggy look to the screen which is undesirable to the user.

A number of ways have been described by prior art to retain a screen edge within a side track. This is desirable for a number of reasons because a captive screen gives a sealed screen edge so insects cannot get around the screen edges.

This is also desirable for screens that block sunlight, wind, cold weather, and rain. Retaining a screen edge is desirable but it is also desirable to maintain the deployed screen to appear as flat as possible to improve the aesthetics of the deployed screen. A flat screen is best achieved when there is a mechanism for adjusting the side track to increase or decrease the tension of the screen between the side tracks. Prior art attempts to provide an adjustable screen are not sufficiently functional (e.g., magnets susceptible to corrosion—shortened useful life—due to open magnet channels), or are larger than they need be, or have to be produced at a higher cost due to excessive material usage.

In particular, in U.S. Pat. Nos. 9,719,292; 10,036,198; and 11,421,474 ('292, '198, and '474 prior art patents shown in FIGS. 21-22, disclose open magnet channels, which exposes the magnets to the ambient atmospheric elements (e.g., water, debris, etc.), which will lead to magnet corrosion. The shortcoming is that the magnets are more than 60% iron and have a thin nickel plating layer. Once this plating is scratched or damaged, the corrosion proceeds rapidly. Once a magnet corrodes, it will lose its magnetism and the magnetic tensioning mechanism will no longer function. For a product that is primarily outdoors, this is an issue because the screen assemblies are exposed to ambient atmospheric elements, especially if tracks are part of a patio near a chlorinated pool or near the ocean where salt is in the air. Salt and chlorine are both strong electrolytes which are suspended in the air and when these contaminants find their way to into the open magnet channels and settle in between the magnets and the aluminum magnet channel, corrosion sets in rapidly.

Because it is common for such screen tracks to be used at a patio, near a pool or an ocean, it is a common occurrence for the magnets to corrode. The issue is the electrolysis that occurs between dissimilar metals when exposed to an electrolyte. To combat corrosion there are two options, permanently electrically isolate the materials or isolate the materials from the electrolytes.

It is impractical to permanently electrically isolate the magnets from the receiving channel for several reasons. One is that debris will pile up inside the open channel that will collect electrolytes and form a conductive bridge between the isolated components. Another reason why this is impractical is that a coating applied to the magnet such as epoxy, has a relatively short lifespan and any microscopic surface scratch will still lead to corrosion.

Studies have shown that under conditions of accelerated weathering tests on nickel plated neodymium magnets, where the magnets are submerged in salt water, corrosion begins within a matter of days and by 6 weeks, the magnets are significantly deteriorated thereby ending their useful life.

Furthermore, referring to FIGS. 21-22 (prior art) the aforementioned prior art has inner screen tracks that can be removed from the open side of the channel if the wind is strong. Such removably is an inherent shortcoming because it is also how the inner track is inserted into the channel. Thus, any condition, such as strong winds from the side that would make the screen flap, could reproduce the angular movements that are used to insert the screen track into the channel.

In addition, under high screen loads, tension forces pushing against the retaining tabs will cause the side walls of the outer track to deform and the inner track to pop out. We can see this in our finite element analysis (FEA) where the sidewalls of the outer channel are pushed away from each other. The ineffectiveness of the prior art at keeping the screen receiver within the base track is further demonstrated by the prior art needing the additional reinforcing sleeves for their design.

Notably, referring to FIGS. 21-22, U.S. Pat. Nos. 9,719,292; 10,036,198; and 11,421,474 ('292, '198, and '474 prior art patents) disclose rectilinear prongs that merely engage along a single plane. Such prongs are not suitable for maintaining the screen receiver within the base track when the screen is subject to heavy shear and tensile loads caused by exterior forces (e.g., wind, objects, etc.). In other words, the screen receiver is more likely to disconnect and eject from the base track thereby causing screen operation failure. Reinserting the screen receiver into the base track requires undesirable time and energy.

Accordingly, a need remains for an automatic tensioning side track assembly to overcome at least one aforementioned shortcoming. The exemplary embodiment(s) satisfy such a need by providing an automatic tensioning side track assembly that is convenient and easy to use, lightweight yet durable in design, versatile in its applications, and configured for maintaining a retractable screen of a retractable screen enclosure (e.g., patio) assembly at a desired tensioned state while external shear and tension forces are exerted against the retractable screen during ambient weather conditions and repetitive use over extended time periods (e.g., the prongs of the present disclosure keep the sidewalls from deforming and thereby prevent the screen track from coming out of the outer channel).

BRIEF SUMMARY OF NON-LIMITING EXEMPLARY EMBODIMENT(S) OF THE PRESENT DISCLOSURE

In view of the foregoing background, it is therefore an object of the non-limiting exemplary embodiment(s) to provide an automatic tensioning side track assembly for maintaining a retractable screen of a retractable screen enclosure (e.g., patio) assembly at a desired tensioned state while external shear and tension forces are exerted against the retractable screen during ambient weather conditions and repetitive use over extended time periods. These and other objects, features, and advantages of the non-limiting exemplary embodiment(s) are provided by an automatic tensioning side track assembly for maintaining a retractable screen of a retractable screen enclosure assembly at a desired tensioned state. Such an automatic tensioning side track assembly includes a stationary base track, a dynamic screen receiver being adjustably engaged to the base track, a first magnet being engaged with the dynamic screen receiver, a second magnet being engaged with the stationary base track, and a screen attached to the dynamic screen receiver. Such a screen receiver is displaced along a vertical travel path and along a horizontal travel path registered orthogonal to the vertical travel path. Advantageously, the first magnet is oppositely charged relative to the second magnet and is configured to maintain an attractive magnetic force with the second magnet. In this manner, the first magnet is disposed at a first position associated with a first rectilinear horizontal distance away from the second magnet when the screen is at a substantially planar configuration and has a desired tensioned state. Advantageously, the first magnet is disposed at a second position associated with a second rectilinear horizontal distance away from the second magnet when the screen is at a substantially bowed configuration and has an undesired tensioned state. Advantageously, the first magnet is configured to automatically return from the second position to the first position after the screen is displaced to the substantially bowed configuration. The screen receiver is dynamic relative to a stationary position of the base track.

In a non-limiting exemplary embodiment, the screen receiver is disposed within the base track when disposed at both the first position and the second position.

In a non-limiting exemplary embodiment, the second magnet is stationary relative to the stationary base track and the dynamic first magnet, the first magnetic being reciprocated along a bi-directional travel path starting at the first position and at the first rectilinear horizontal distance and terminating at the second position and at the second rectilinear horizontal distance.

In a non-limiting exemplary embodiment, the screen receiver includes a screen track suitably sized and shaped for receiving an existing screen edge, and a screen pre-feeder connected to a top opening of the screen track. Advantageously, the screen pre-feeder is configured to travel between the first position and the second position.

In a non-limiting exemplary embodiment, the first magnet is positioned adjacent to the screen track and beneath the screen pre-feeder.

In a non-limiting exemplary embodiment, the second magnet is disposed laterally of the first magnet.

In a non-limiting exemplary embodiment, the screen receiver includes a plurality of L-shaped prongs seated within the base track.

In a non-limiting exemplary embodiment, the base track includes a plurality of L-shaped pockets disposed along a travel path of the L-shaped prongs.

In a non-limiting exemplary embodiment, the L-shaped prongs are configured to releasably engage the L-shaped pockets as the screen receiver is rectilinearly reciprocated along the bi-directional travel path inside the base track.

In a non-limiting exemplary embodiment, the screen is configured to be bowed at the undesired tension state and when the L-shaped prongs are engaged with the L-shaped pockets.

In a non-limiting exemplary embodiment, the screen is configured to be planar at the desired tensioned state and when the L-shaped prongs are disengaged and laterally displaced away from the L-shaped pockets.

In a non-limiting exemplary embodiment, the screen receiver further includes a first magnet channel configured to receive the first magnet therein, and a bottom end cap removably connected to a bottom opening of the first magnet channel. Advantageously, the screen pre-feeder includes a bifurcated plug removably attached to a top opening of the first magnet channel.

In a non-limiting exemplary embodiment, the base track includes a plurality of end blocks removably inserted into axially opposed open ends of the second magnet channel.

There has thus been outlined, rather broadly, the more important features of non-limiting exemplary embodiment(s) of the present disclosure so that the following detailed description may be better understood, and that the present contribution to the relevant art(s) may be better appreciated. There are additional features of the non-limiting exemplary embodiment(s) of the present disclosure that will be described hereinafter and which will form the subject matter of the claims appended hereto.

BRIEF DESCRIPTION OF THE NON-LIMITING EXEMPLARY DRAWINGS

The novel features believed to be characteristic of non-limiting exemplary embodiment(s) of the present disclosure are set forth with particularity in the appended claims. The non-limiting exemplary embodiment(s) of the present disclosure itself, however, both as to its organization and method of operation, together with further objects and advantages thereof, may best be understood by reference to the following description taken in connection with the accompanying drawings in which:

Figure 21:
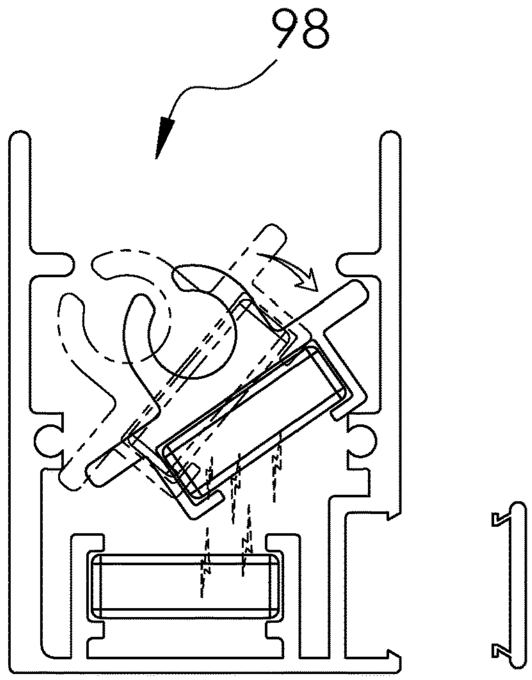
FIG. 21 (PRIOR ART)
Figure 22:
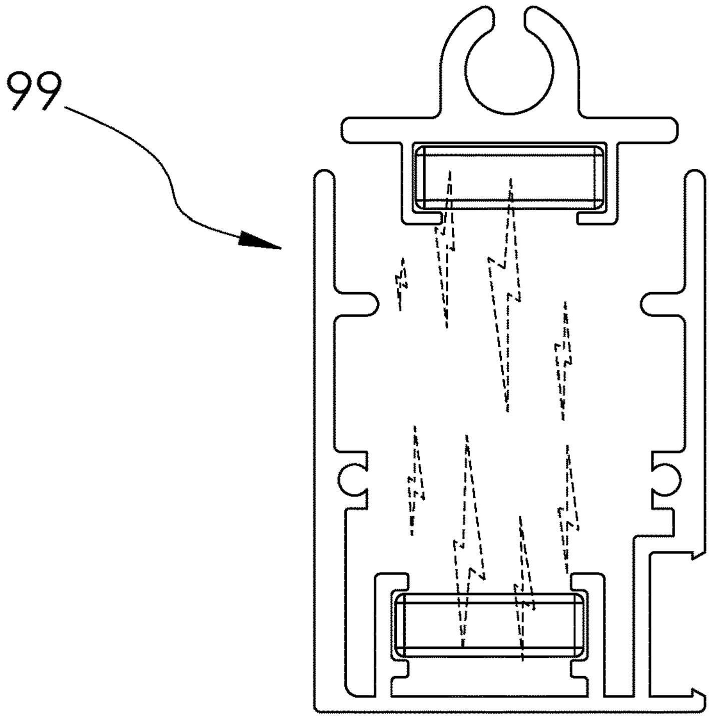
FIG. 22 (PRIOR ART)

FIG. 21 (prior art) is a top plan view of U.S. Pat. No. 9,719,292 showing rectilinear prongs at both the screen receiver and base track, which are ineffective for maintaining the screen receiver within the base track. Also shown are open magnet channels that are exposed to fluid and debris, which facilitate magnet corrosion and reduce their useful life; and FIG. 22 (prior art) is a top plan view of U.S. Pat. No. 9,719,292 showing its screen track being removable from its base track especially when shear and tension forces are exerted against the screen.

Those skilled in the art will appreciate that the figures are not intended to be drawn to any particular scale; nor are the figures intended to illustrate every non-limiting exemplary embodiment(s) of the present disclosure. The present disclosure is not limited to any particular non-limiting exemplary embodiment(s) depicted in the figures nor the shapes, relative sizes or proportions shown in the figures.

DETAILED DESCRIPTION OF NON-LIMITING EXEMPLARY EMBODIMENT(S) OF THE PRESENT DISCLOSURE

The present disclosure will now be described more fully hereinafter with reference to the accompanying drawings, in which non-limiting exemplary embodiment(s) of the present disclosure is shown. The present disclosure may, however, be embodied in many different forms and should not be construed as limited to the non-limiting exemplary embodiment(s) set forth herein. Rather, such non-limiting exemplary embodiment(s) are provided so that this application will be thorough and complete, and will fully convey the true spirit and scope of the present disclosure to those skilled in the relevant art(s). Like numbers refer to like elements throughout the figures.

The illustrations of the non-limiting exemplary embodiment(s) described herein are intended to provide a general understanding of the structure of the present disclosure. The illustrations are not intended to serve as a complete description of all of the elements and features of the structures, systems and/or methods described herein. Other non-limiting exemplary embodiment(s) may be apparent to those of ordinary skill in the relevant art(s) upon reviewing the disclosure. Other non-limiting exemplary embodiment(s) may be utilized and derived from the disclosure such that structural, logical substitutions and changes may be made without departing from the true spirit and scope of the present disclosure. Additionally, the illustrations are merely representational are to be regarded as illustrative rather than restrictive.

One or more embodiment(s) of the disclosure may be referred to herein, individually and/or collectively, by the term "non-limiting exemplary embodiment(s)" merely for convenience and without intending to voluntarily limit the true spirit and scope of this application to any particular non-limiting exemplary embodiment(s) or inventive concept. Moreover, although specific embodiment(s) have been illustrated and described herein, it should be appreciated that any subsequent arrangement designed to achieve the same or similar purpose may be substituted for the specific embodiment(s) shown. This disclosure is intended to cover any and all subsequent adaptations or variations of other embodiment(s). Combinations of the above embodiment(s), and other embodiment(s) not specifically described herein, will be apparent to those of skill in the relevant art(s) upon reviewing the description.

References in the specification to "one embodiment(s)", "an embodiment(s)", "a preferred embodiment(s)", "an alternative embodiment(s)" and similar phrases mean that a particular feature, structure, or characteristic described in connection with the embodiment(s) is included in at least an embodiment(s) of the non-limiting exemplary embodiment(s). The appearances of the phrase "non-limiting exemplary embodiment" in various places in the specification are not necessarily all meant to refer to the same embodiment(s).

Directional and/or relationary terms such as, but not limited to, left, right, nadir, apex, top, bottom, vertical, horizontal, back, front and lateral are relative to each other and are dependent on the specific orientation of an applicable element or article, and are used accordingly to aid in the description of the various embodiment(s) and are not necessarily intended to be construed as limiting.

If used herein, "about," "generally," and "approximately" mean nearly and in the context of a numerical value or range set forth means±15% of the numerical.

If used herein, "substantially" means largely if not wholly that which is specified but so close that the difference is insignificant.

The non-limiting exemplary embodiment(s) is/are referred to generally in FIGS. 1-20 and is/are intended to provide an innovative automatic tensioning side track assembly 30 having a side track 34 for maintaining a retractable screen 31 of a retractable screen enclosure (e.g., patio and door enclosures) system 32 at a desired tensioned state 33*a* while external shear and tension forces are exerted against the retractable screen 31 during ambient weather conditions and repetitive use over extended time periods. Such a structural configuration yields the new, useful, and unpredicted result of automatically tensioning the retractable screen 31 from an undesired tensioned state 33 to a desired tensioned state 33*a* by automatically dampening (dissipating) the shear and tension external forces exerted against the retractable screen 31. Furthermore, the side track 34 is able to withstand the external forces while having a reduced cross-sectional thickness and without requiring a separate outer protective sleeve (which is required by the cited prior art 98, 99). Such advantages yield the unexpected result of less material costs, less weight, and less components to assemble during installation and maintenance disassembly.

In a non-limiting exemplary embodiment, the automatic tensioning side track assembly 30 includes a base track 35, a screen receiver 38 having a screen track 38*a* slidably disposed within said base track 35, a screen pre-feeder 36, and a plurality of magnets 37, 37*a*. The base track 35, screen receiver 38 and screen track 38*a* are made from extruded aluminum and, as such, the mechanical elements of the side track assembly 30 are incorporated into the structural configuration of the aluminum extrusion thereby reducing manufacturing time and expensive. The base track 35 may have a U-channel shape 39 with a cavity 40 on the back side to allow fasteners to secure the base track 35 to a support structure (wall, post, or the like) and then hidden by a snap fit cover 41. Electrical wires may be run through the back side cavity 40. Additionally, screw bosses 42 are incorporated into the base track 35 for attaching a top cover plate 43 and a bottom cover plate 43*a* thereto.

In a non-limiting exemplary embodiment, the screen track 38*a* may have a C-channel shape 44 with an open side 44*a* in which a screen bead edge 31*a* linearly slides. Advantageously, L-shaped prongs 46 are provided for adjustably locking the screen track 38*a* within the base track 35 when under load. A screw boss 42 is provided at the screen pre-feeder 36 and attaches to the screen receiver 38. A first magnet holder 47 is integrally located at the screen receiver 38 and a second magnet holder 48 is attached to the base track 35. The magnets 37, 37*a* are held captive within their respective holders 47, 48 (which can be dedicated channels) at the base track 35 and at the screen track 38*a*, respectively. These dedicated magnet channels 47, 48 securely hold the magnets 37, 37*a* at a specific distance and position from each other (via a magnetic attracting force). The oppositely charged magnets 37, 37*a* are arranged to create an attracting force between the screen track 38*a* and the base track 35, this magnetic attracting force serves as the catalyst for automatically causing the screen 31 to straighten out to the desired tensioned state 33*a* (straight screen 31) after the external force (shear or tension forces) depress the screen to the undesired tensioned state 33 (bent screen 31). Advantageously, the first magnet 37 of the screen track 38*a* (and screen receiver 38) is caused to reciprocate along a bi-directional linear travel path 49 relative to a stationary position of the second magnet 37*a* of the base track 35. In particular, the first magnet 37 is initially at the desired tensioned state 33*a* (substantially straight screen shape) before the external forces are exerted thereagainst. When the external forces (wind, rain, objects) are exerted against the screen 31, the screen 31 (and first magnet 37 and screen receiver 38) are linearly displaced away from the second magnet 37*a*. Such displacement morphs the screen 31 to the undesired tensioned state 33 (bent/loose screen that is under extra stress). Then, the opposing magnetic forces automatically cause the first magnet 37 (and screen receiver 38) to automatically return towards the second magnet 37*a*, so that the screen 31 is automatically returned to the initial desired tensioned state 33*a* (substantially straight taut screen shape).

In a non-limiting exemplary embodiment, the screen receiver 38 includes a pair of first opposed L-shaped prongs 46 frictionally and continuously engaged with an interior side wall 35*a* of said base track 35 and selectively abutted against a pair of second opposed L-shaped prongs 46*a* statically anchored to the base track 35 sidewall 35*a*. Such a pair of second opposed L-shaped prongs 46*a* provide displacement stops for preventing the first magnet 37 from traveling beyond a maximum threshold distance away from said second magnet 37*a* (first magnet 37 cannot exit the base track 35). Such a pair of second opposed L-shaped prongs 46*a* define a pair of pockets 51 configured to receive and stop the pair of first opposed L-shaped prongs 46 from exiting the base track 35.

In a non-limiting exemplary embodiment, as noted above, the single extrusion base track 35 is provided with receiving pockets 51 for engaging the screen receiver 38 first L-shaped prongs 46. Such pockets 51 frictionally and effectively interlock (hook) with the associated first L-shaped prongs 46 thereby yielding the new, useful, and unpredicted result of maintaining the screen receiver 38 within the base track 35 even when the screen 31 is subject to heavy shear and tensile loads caused by exterior forces (e.g., wind, rain, objects, etc.).

In a non-limiting exemplary embodiment, base track 35 may have tapered tips 52 to allow the base track 35 to receive and frictionally abut an adjacent base track 35, if needed.

In a non-limiting exemplary embodiment, the base track 35 may further have a retaining nub 53 for maintaining the second magnet 37*a* at a substantially stable (stationary) position relative to dynamic first magnet 37.

In a non-limiting exemplary embodiment, the base track cavity 40 may have a depression 54 configured to be a drill tip locator. Such a cavity 40 is configured to receive a fastener therethrough while permitting electrical wires to pass therein. A cover plate 41 is detachably affixed to the cavity 40.

In a non-limiting exemplary embodiment, as perhaps best shown in FIGS. 11-11D, 13 and 15, the screen receiver 38', 38''' may have a screw boss 42 so the plastic injection molded screen pre-feeder 36 can be fastened directly to the screen track 38*a*. It may be preferred to use such a fastened screen pre-feeder 36 for strengthening the screen receiver 38, which is exposed to the external forces at the screen 31 and the reciprocating magnetic attractive (sliding) forces between the dynamic first magnet 37 and the stationary second magnet 37*a*. Additionally, the injection molded pre-feeder 36 eliminates hand forming the screen entry (leading bead edge 31*a*) into an extrusion that would otherwise be needed.

Figure 6:
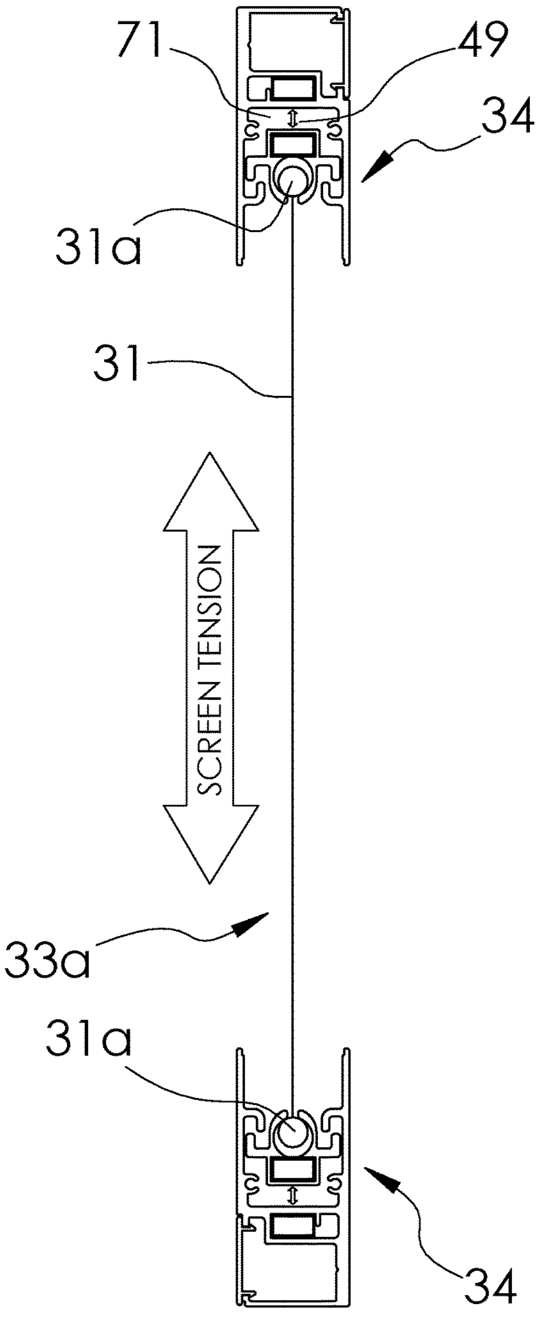
FIG. 6 is a top plan view of two opposing automatic tensioning side track assemblies having a screen attached therebetween at a desired (normal) tensioned state, in accordance with a non-limiting exemplary embodiment of the present disclosure.
Figure 7:
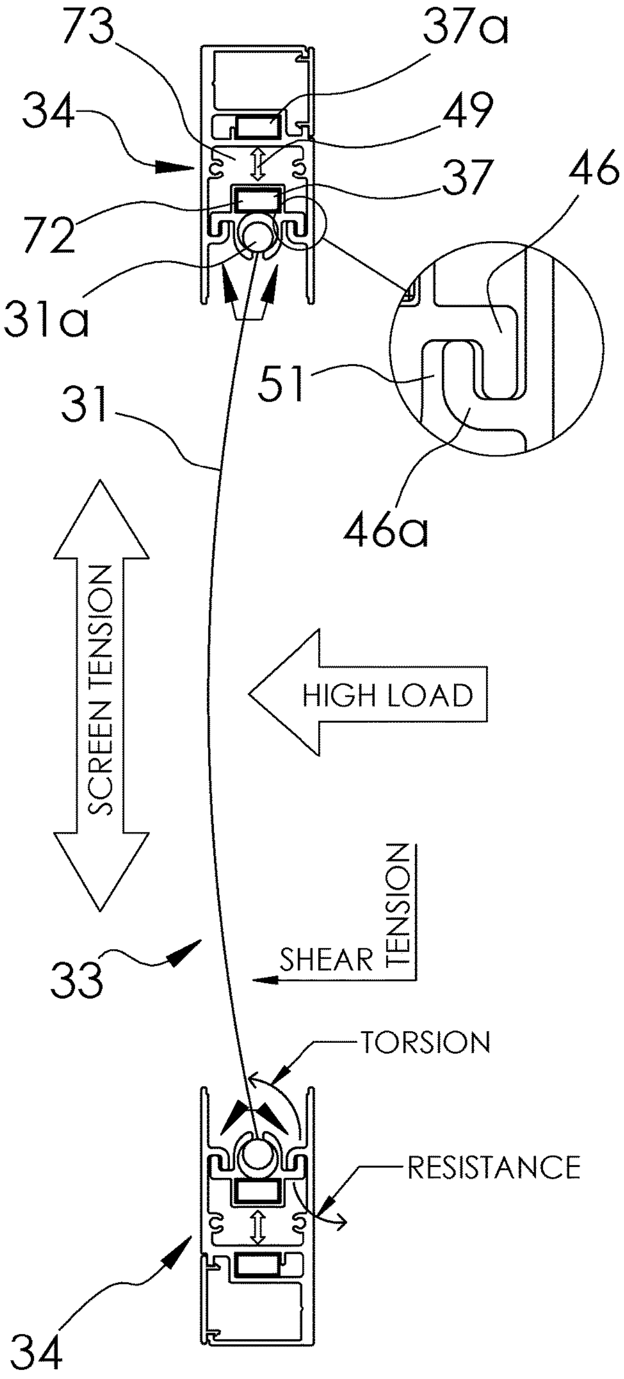
FIG. 7 is a top plan view of the two opposing automatic tensioning side track assemblies having the screen attached therebetween at an undesired (excessive) tension state after receiving an external force, in accordance with a non-limiting exemplary embodiment of the present disclosure.
Figure 8:
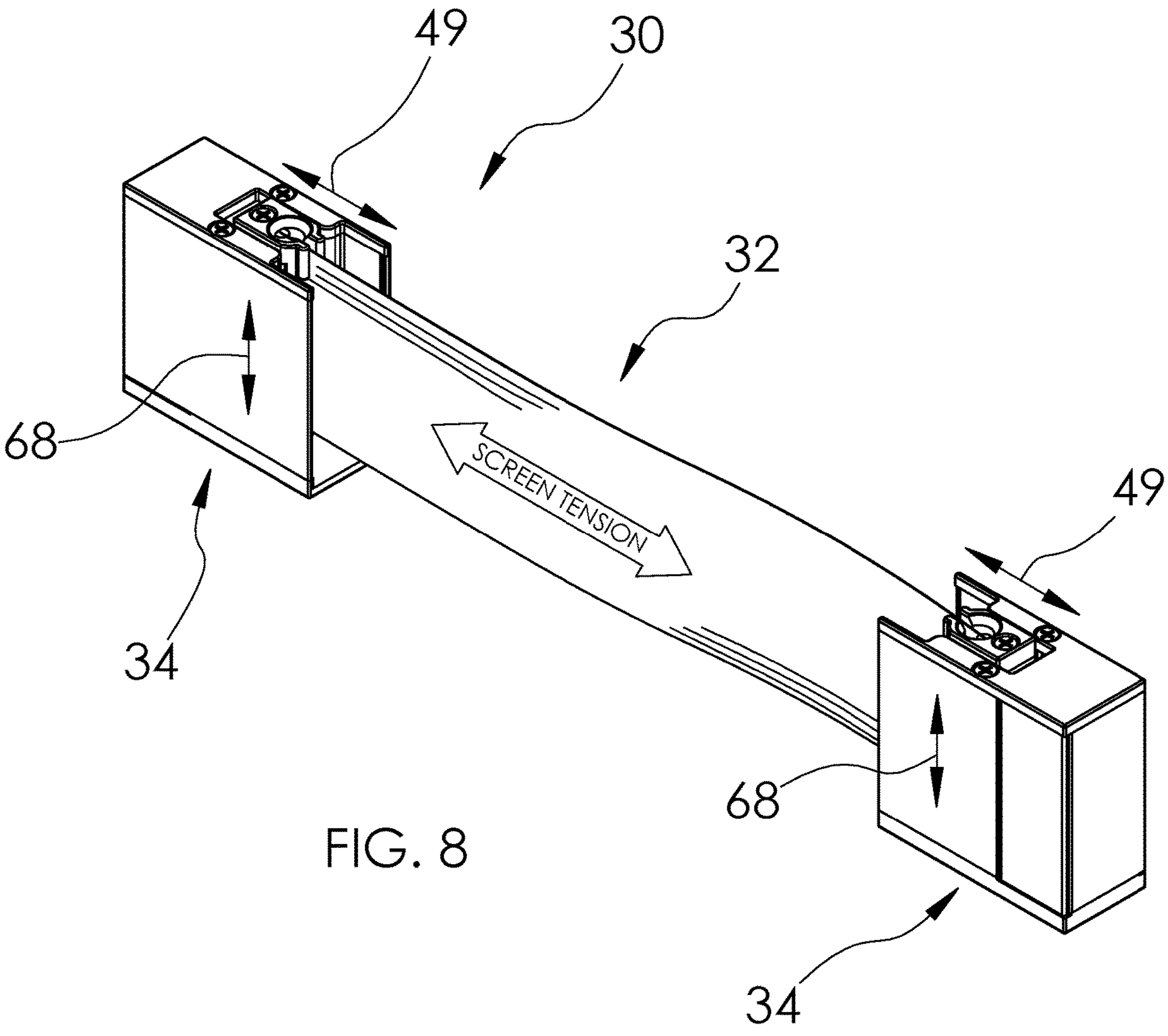
FIG. 8 is a perspective view of the two opposing automatic tensioning side track assemblies having the screen attached therebetween at a desired (normal) tensioned state, in accordance with a non-limiting exemplary embodiment of the present disclosure.
Figure 9:
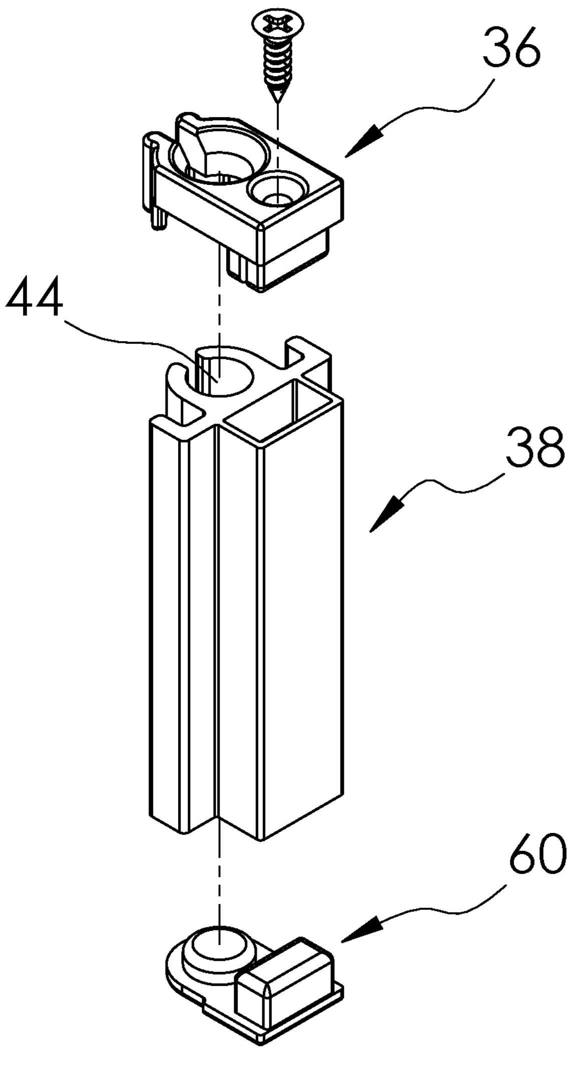
FIG. 9 is an exploded perspective view of the screen receiver and screen pre-feeder, in accordance with a non-limiting exemplary embodiment of the present disclosure.
Figure 10:
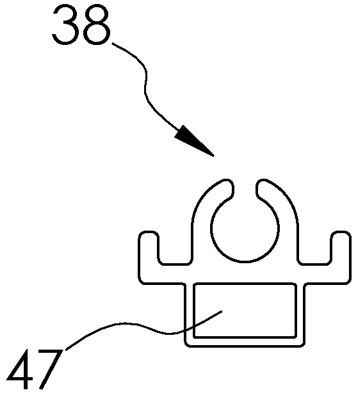
FIG. 10 is a top plan view of the screen receiver shown in FIG. 9, in accordance with a non-limiting exemplary embodiment of the present disclosure.

In a non-limiting exemplary embodiment, referring to FIGS. 6 and 7, the automatic tensioning assembly 30 advantageously evenly tensions the screen 31 between the two oppositely facing side tracks 34 by using a magnetic attracting force between the first magnet 37 and the second magnet 37*a*. Such first and second magnets 37, 37*a* act as a reverse spring, pulling laterally against the opposite screen edges 31*a* (towards each respective base track 35). Such opposed screens 31 have an enlarged bead 31*a* adjustably fit inside the open C-shaped screen tracks 38*a* of the associated opposite screen receivers 38. Advantageously, when external forces create a load on the screen 31 (bend the screen 31 to a higher tensioned state), the first magnet 37 initially displaces away from the second magnet 37*a* to relieve the higher tension. Then, the attractive magnetic force between the first magnet 37 and the second magnet 37*a* automatically return the first magnet 37 back toward the second magnet 37*a*, thereby automatically flattening and tensioning the screen 31 to the desired tensioned state 33*a* (straighten the screen 31).

In a non-limiting exemplary embodiment, referring to FIG. 7, the automatic tensioning assembly 30 is shown when the screen 31 is exposed to the external forces (higher loads) such as that induced by strong winds, rain, objects. When strong winds push against the screen 31, undesired tension develops in the screen 31 overcoming the magnetic force of the magnets 37, 37*a*. This undesired tension pulls and rotates the screen track 38*a* outward relative to the stationary position of the base track 35. Dynamic L-shaped prongs 46 at the dynamic screen receiver 38 engage receiving stationary pockets 51 in the stationary base track 35 such that the screen receiver 38 locks against the base track 35 and is prohibited from disengaging (exiting) the base track 35. Screen 31, under a load, applies tension and shear forces to each side track 34 and induces a torsional load (rotate) on the screen track 38*a*. The L-shaped prongs 46, once engaged in the receiving pockets 51 of the base track 35, resist this torsional load and the engaged L-shaped prongs 46 keep the side walls 35*a* of the base track 35 from deforming from these loads. This interaction prevents the screen receiver 38 from being pried (forced) out of the base track 35. Because the shear loads are transferred and dissipate as tension loads along the base track 35 side walls 35*a*, the base track 35 wall thicknesses can be thinner thereby decreasing its manufacturing cost. Advantageously, the screen edge beads 31*a* are permitted to rotate within the C-channels 44 of the screen track 38*a* to absorb and help dissipate the external forces acting on the screen 31.

Figure 11:
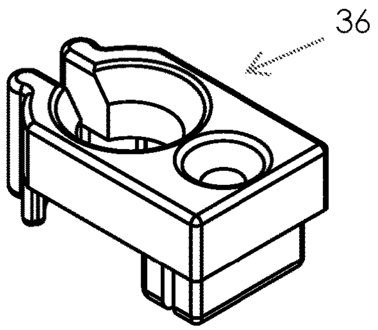
FIG. 11 is an enlarged perspective view of the top screen pre-feeder shown in FIG. 9 and having a L-shaped prong for preventing fluid and debris from entering the magnet-receiving channel, in accordance with a non-limiting exemplary embodiment of the present disclosure.
Figure 11A:
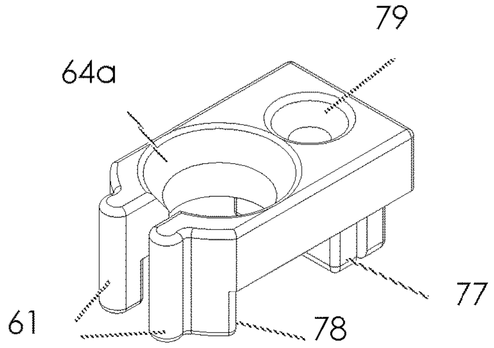
FIG. 11A is another perspective view of the top screen pre-feeder shown in FIG. 11, in accordance with a non-limiting exemplary embodiment of the present disclosure.
Figure 11B:
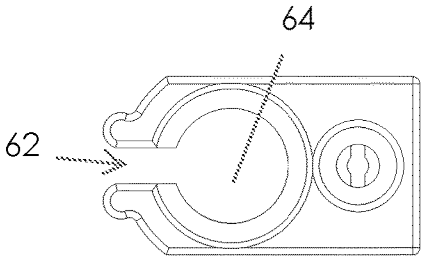
FIG. 11B is a top plan view of the top screen pre-feeder shown in FIG. 11, in accordance with a non-limiting exemplary embodiment of the present disclosure.
Figure 11C:
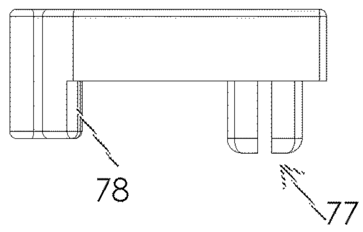
FIG. 11C is side elevational view of the top screen pre-feeder shown in FIG. 11, in accordance with a non-limiting exemplary embodiment of the present disclosure.
Figure 11D:
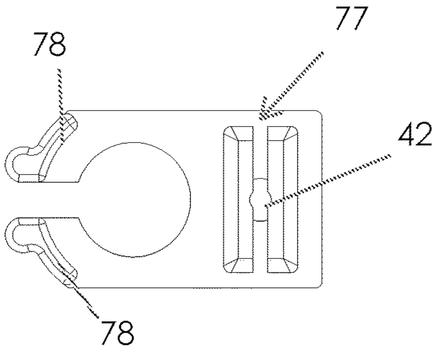
FIG. 11D is a bottom plan view of the top screen pre-feeder shown in FIG. 11, in accordance with a non-limiting exemplary embodiment of the present disclosure.
Figure 12:
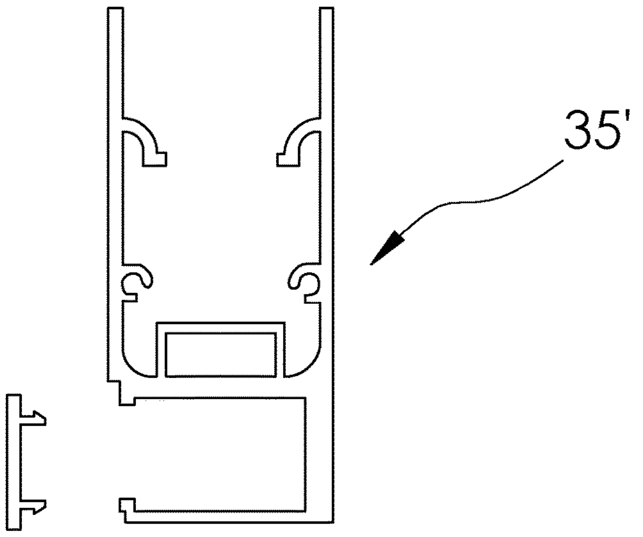
FIG. 12 is a top plan view of the housing for automatic tensioning side track assembly, in accordance with a non-limiting exemplary embodiment of the present disclosure.
Figure 13:
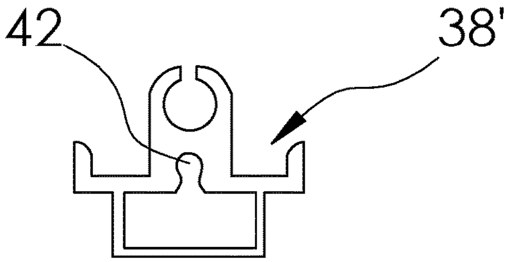
FIG. 13 is a top plan view of an alternate screen receiver, in accordance with a non-limiting exemplary embodiment of the present disclosure.
Figure 14:
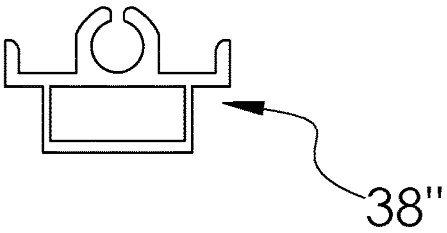
FIG. 14 is a top plan view of yet another alternate screen receiver, in accordance with a non-limiting exemplary embodiment of the present disclosure.
Figure 15:
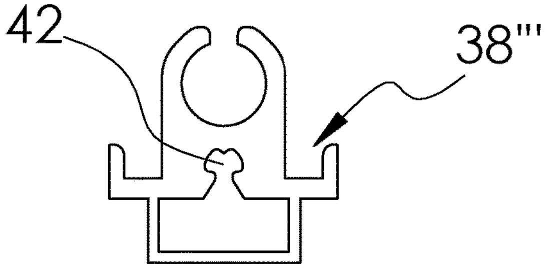
FIG. 15 is a top plan view of yet another alternate screen receiver, in accordance with a non-limiting exemplary embodiment of the present disclosure.
Figure 16:
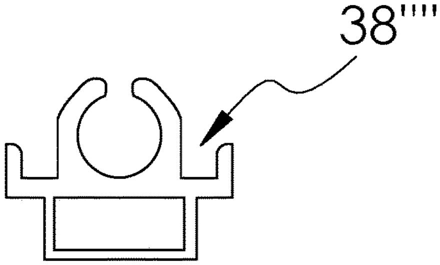
FIG. 16 is a top plan view of yet another alternate screen receiver, in accordance with a non-limiting exemplary embodiment of the present disclosure.
Figure 17:
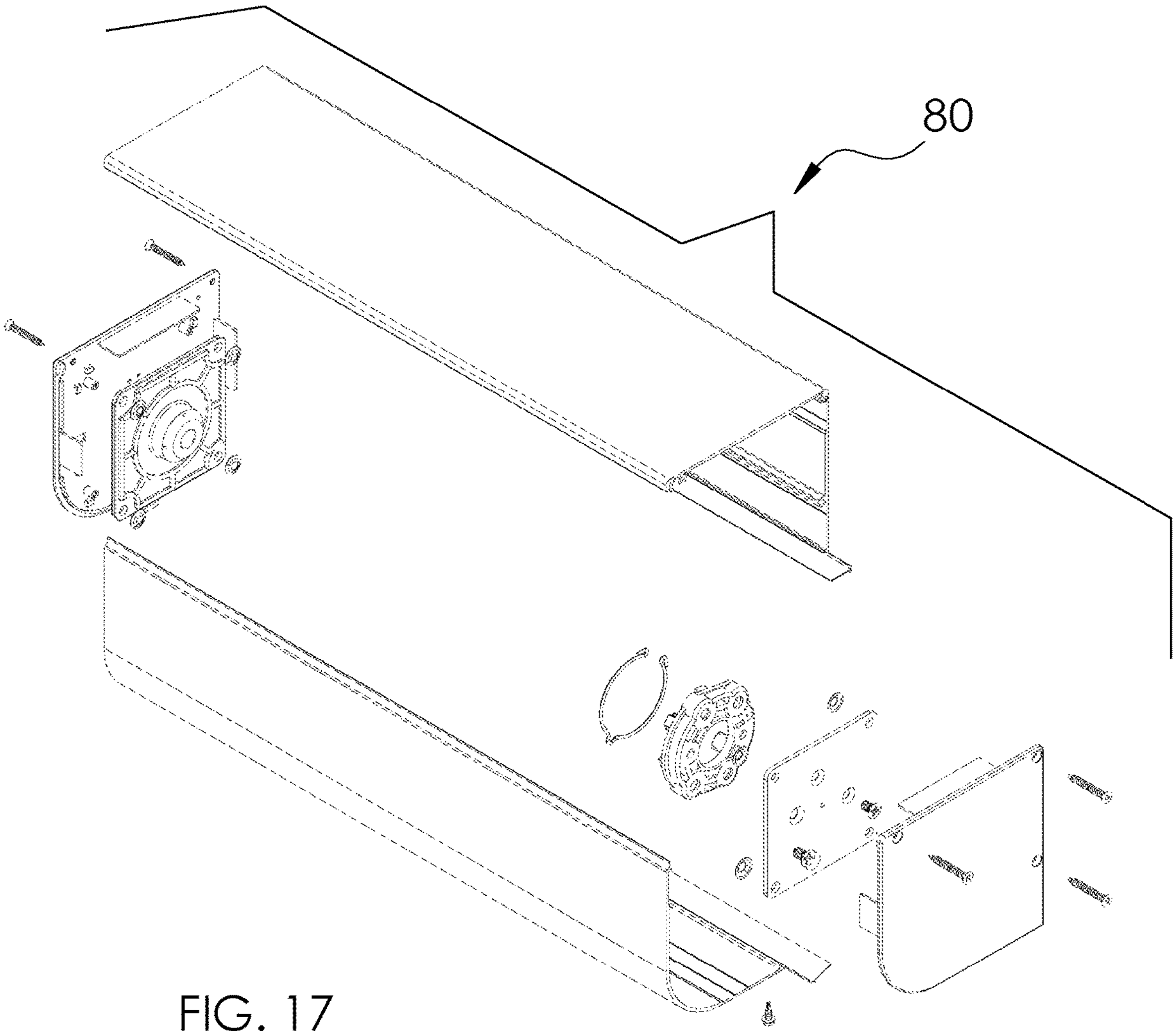
FIG. 17 is an exploded perspective view of a top take-up box (hood assembly) shown in FIG. 1, in accordance with a non-limiting exemplary embodiment of the present disclosure.
Figure 18:
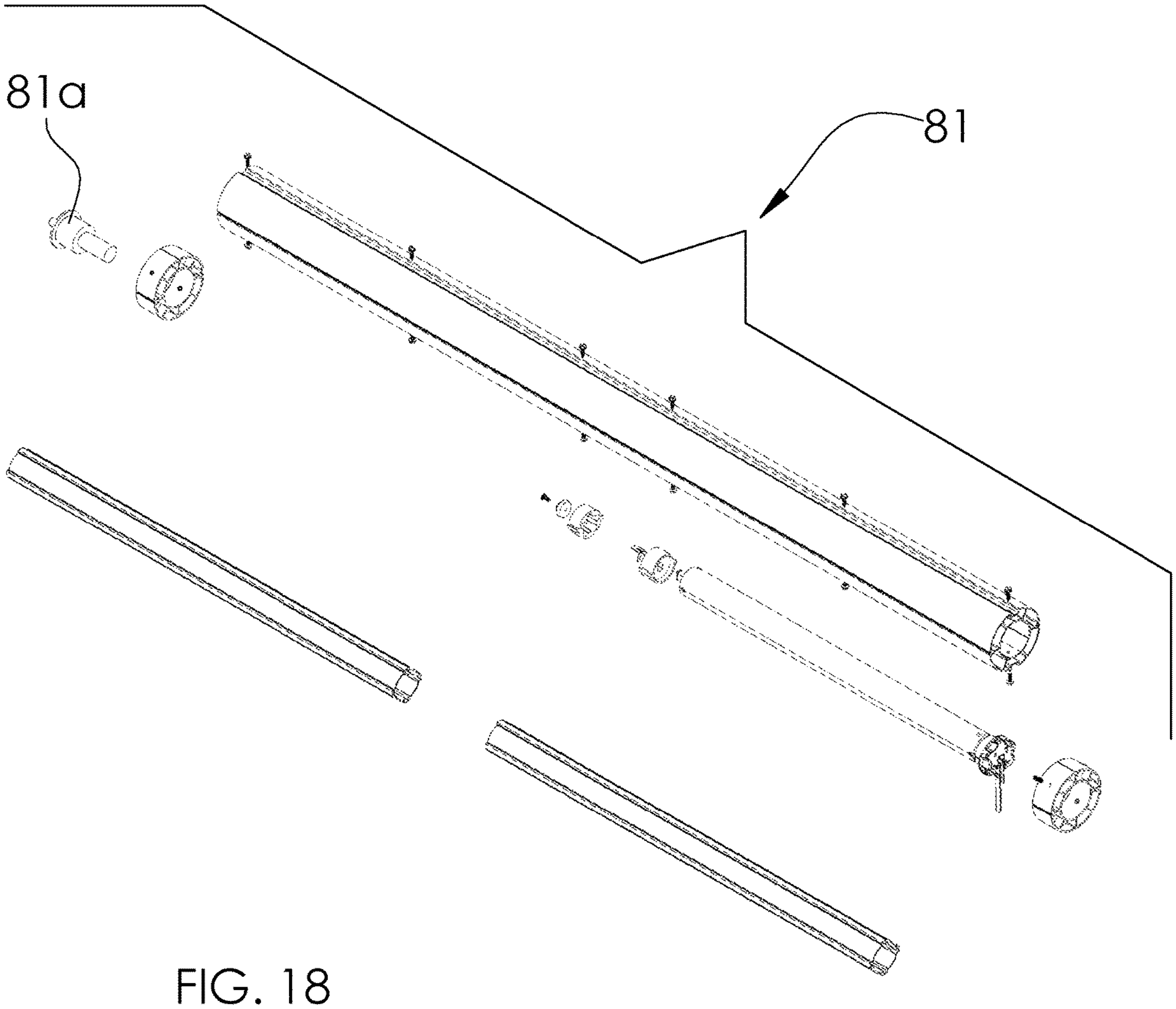
FIG. 18 is an exploded perspective view of a screen reel assembly located within the hood assembly, shown in FIG. 17, in accordance with a non-limiting exemplary embodiment of the present disclosure.
Figure 19:
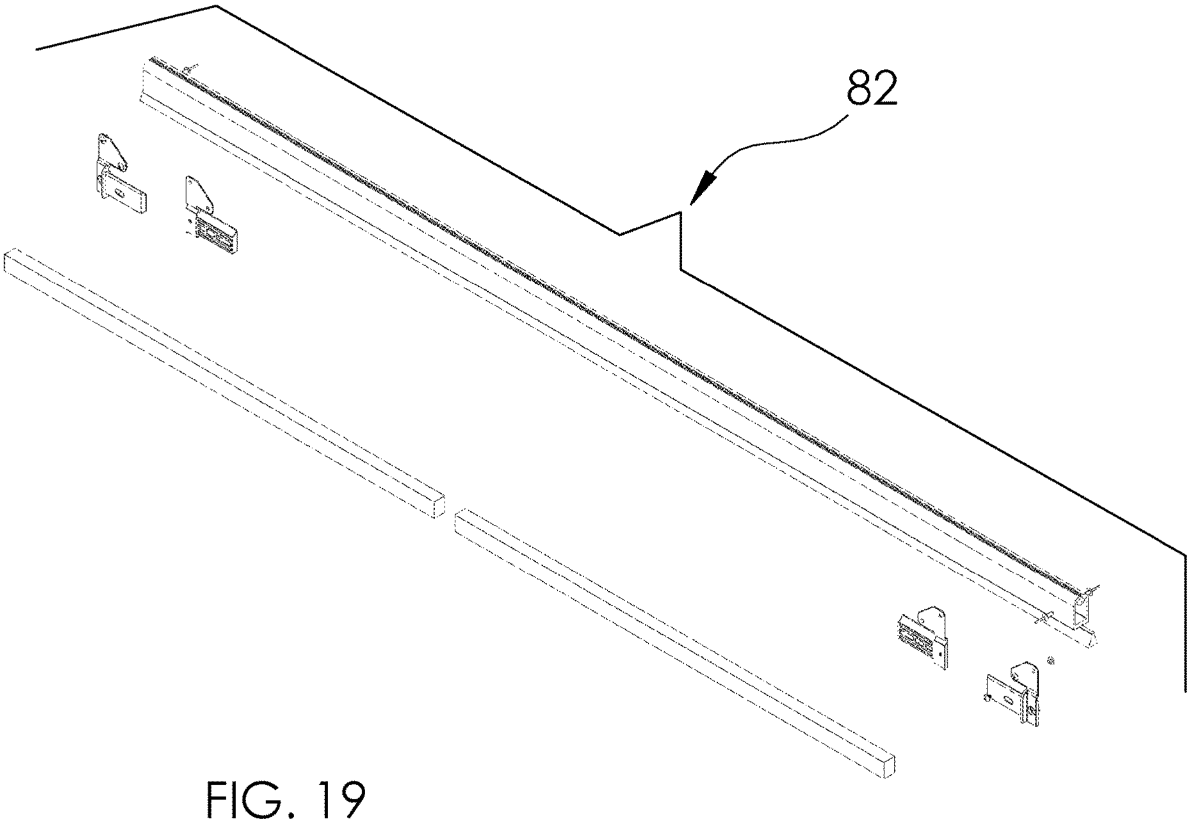
FIG. 19 is an exploded perspective view of a weight bar assembly affixed to a bottom edge of the screen, shown in FIG. 1, in accordance with a non-limiting exemplary embodiment of the present disclosure.
Figure 20:
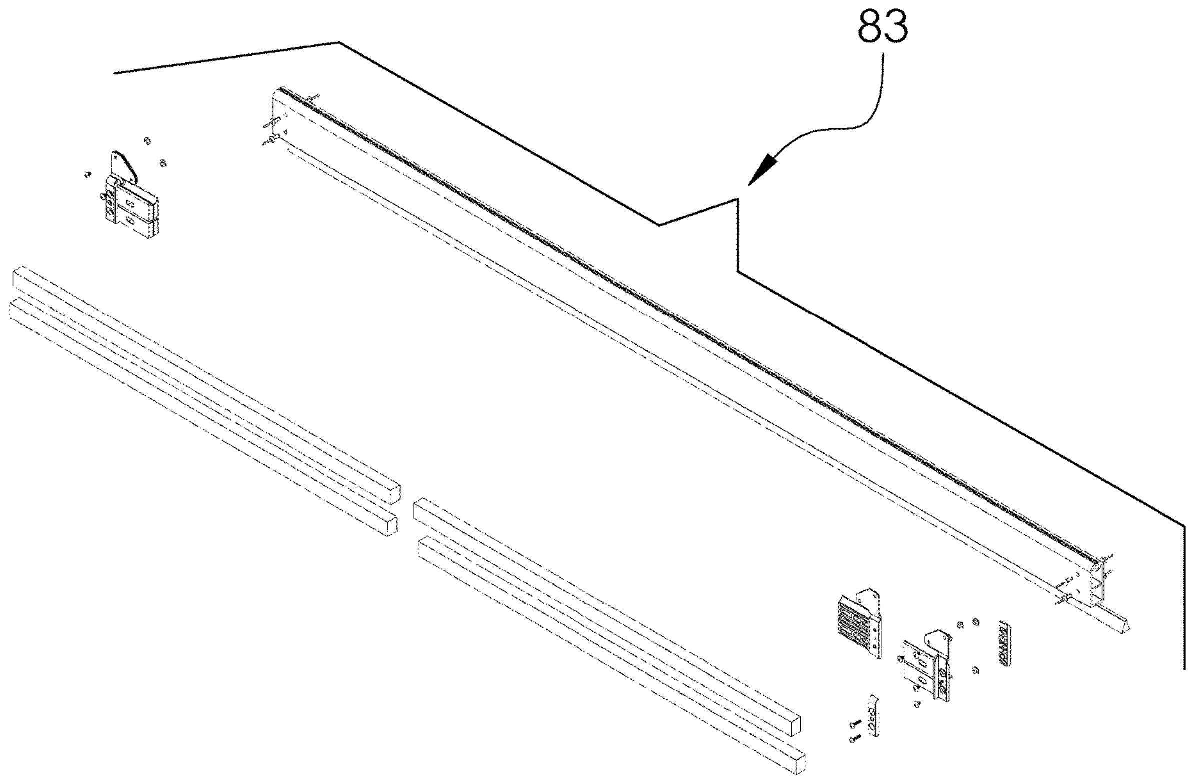
FIG. 20 is an exploded perspective view of another weight bar assembly affixed to a bottom edge of the screen, shown in FIG. 1, in accordance with a non-limiting exemplary embodiment of the present disclosure.

In a non-limiting exemplary embodiment, referring to FIGS. 11-11D the screw boss 42 is deleted from the base track 35 extrusion to save material cost. Instead, the screw boss 42 is located at the screen pre-feeder 36. In addition, the screen pre-feeder 36 has a bifurcated plug 77 at its underside that is complimentary to the first magnet channel 47 associated with the screen pre-feeder 36. An optional screw could be used to expand the bifurcated plug 77 into the first magnet channel 47 to secure it in place. Also, the screen pre-feeder 36 has a screen aperture 64 that is vertically aligned and interfaced with the screen track 38*a* therebeneath.

In a non-limiting exemplary embodiment, referring to FIGS. 4-5A, and 9-11D, the bifurcated plug 77 extends downwardly from the screen pre-feeder 36. Such a bifurcated plug 77 is configured to close a top opening of the first magnet channel 47. No screw boss 42 is provided thereat. Instead, the bifurcated plug 77 has a screw opening 57 to receive a fastener therein and hold the bifurcated plug 77 in place at the top opening of the first magnet channel 47. This is achieved by expanding apart the bifurcated plug 77 via the fastener.

Figure 1:
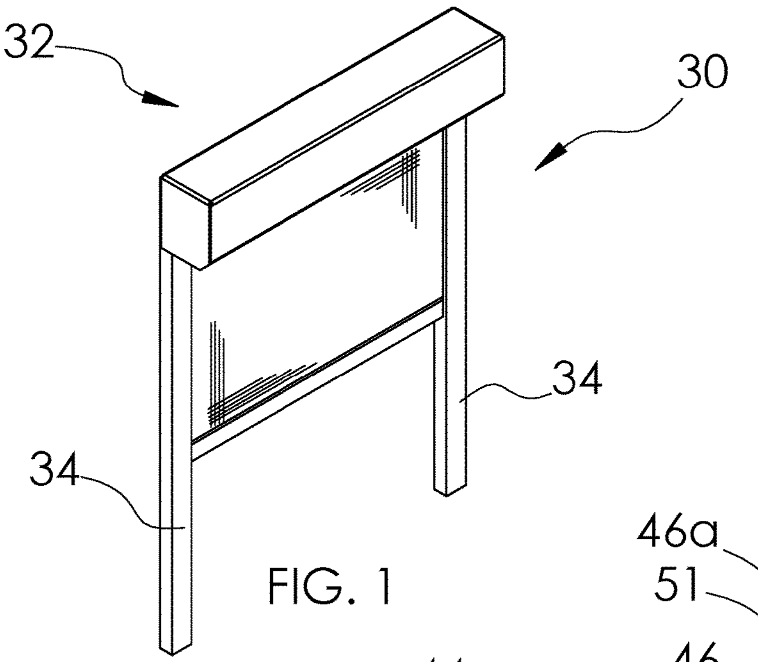
FIG. 1 is a perspective view of a retractable screen assembly employing a pair of opposed automatic tensioning side track assemblies, in accordance with a non-limiting exemplary embodiment of the present disclosure.
Figure 3:
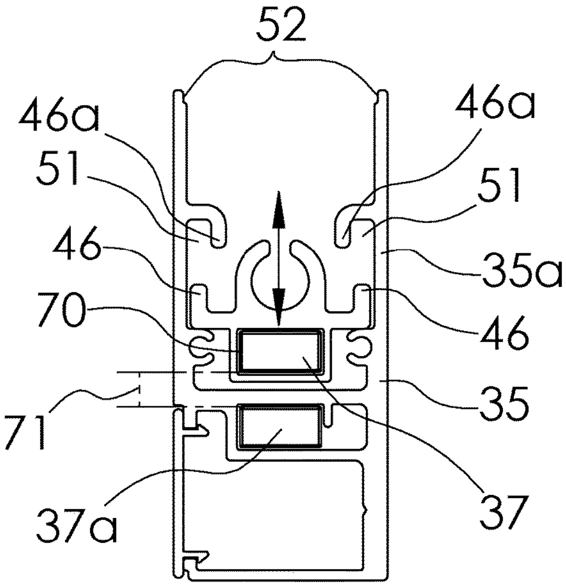
FIG. 3 is a top plan view of the automatic tensioning side track assembly shown in FIG. 2, in accordance with a non-limiting exemplary embodiment of the present disclosure.
Figure 2:
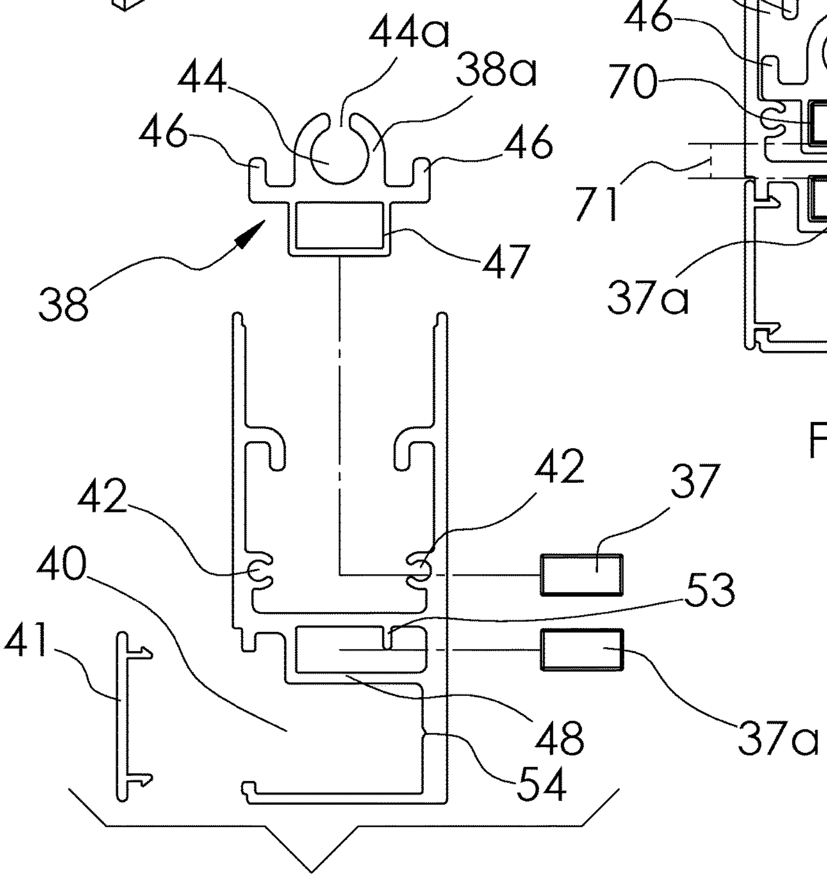
FIG. 2 is an exploded top plan view of the automatic tensioning side track assembly disclosed in FIG. 1, in accordance with a non-limiting exemplary embodiment of the present disclosure.
Figure 4:
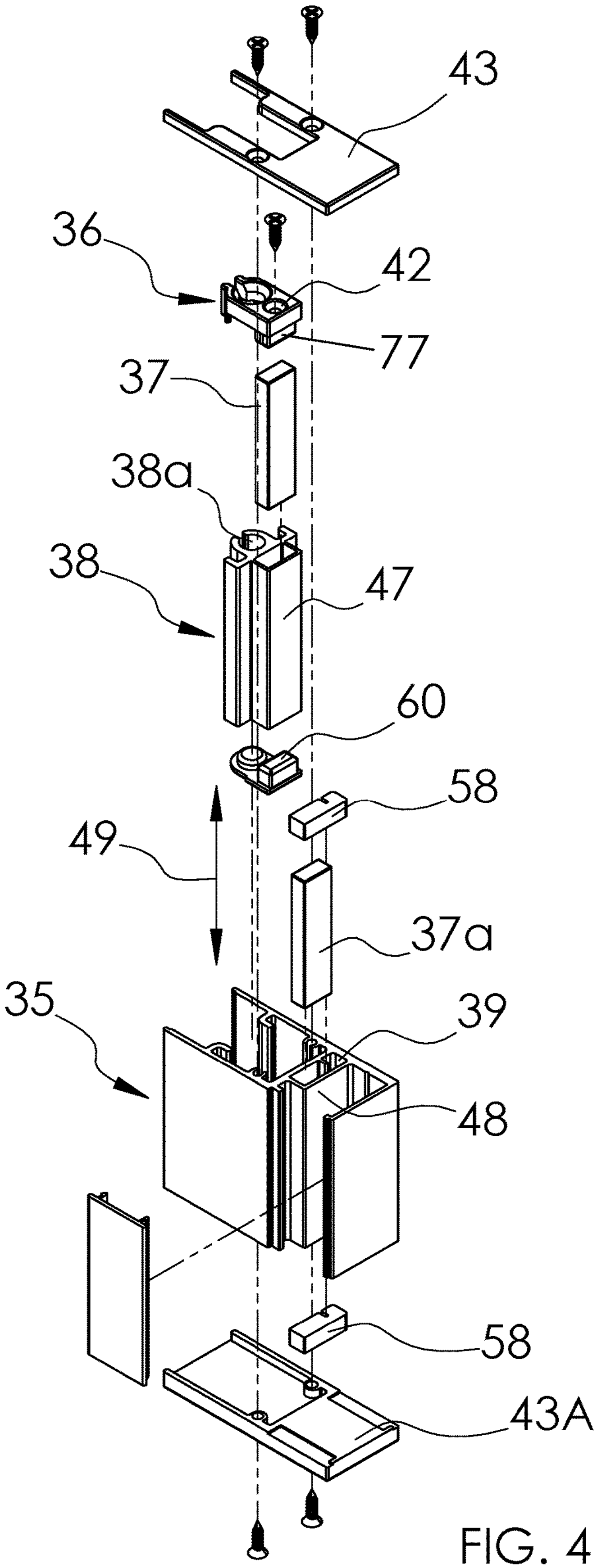
FIG. 4 is another exploded view of the automatic tensioning side track assembly having a screen pre-feeder, a top cap, and a bottom cap, in accordance with a non-limiting exemplary embodiment of the present disclosure.
Figure 4A:
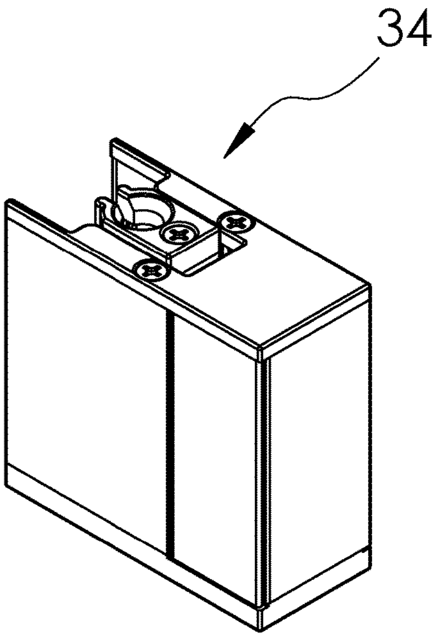
FIG. 4A is a perspective view of the automatic tensioning side track assembly shown in FIG. 4, in accordance with a non-limiting exemplary embodiment of the present disclosure.
Figure 5:
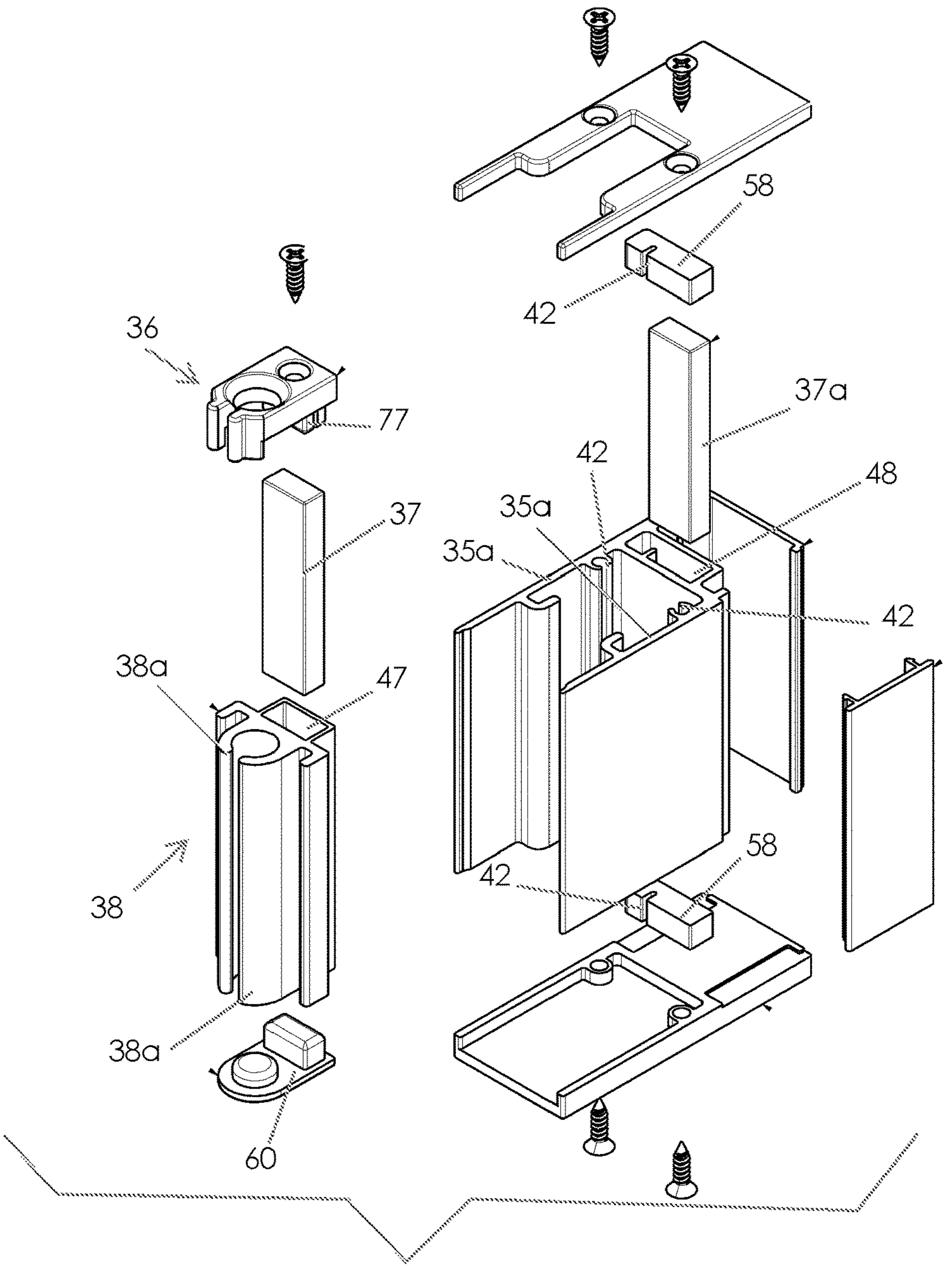
FIG. 5 is another exploded view of the automatic tensioning side track assembly shown in FIG. 4 and having a base track seal (L-shaped prongs) seated over the stationary magnet to prevent corrosion, etc., in accordance with a non-limiting exemplary embodiment of the present disclosure.
Figure 5A:
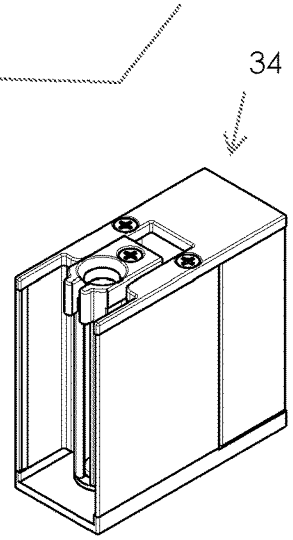
FIG. 5A is a perspective view of the automatic tensioning side track assembly shown in FIG. 5, in accordance with a non-limiting exemplary embodiment of the present disclosure.

In a non-limiting exemplary embodiment, referring to FIGS. 4-5A, a pair of opposed screw bosses 42 are located at end blocks 58, respectively, which are inserted into second magnet channel 48. End blocks 58 are inserted into the axially opposed open ends of the second magnet channel 48 to prevent fluid and debris from contacting the second magnet 37*a*, such fluid and debris can lead to undesirable corrosion of the magnet 37*a*. Fasteners are inserted through the end blocks 58 and into the associated screw bosses 42 for securing the end blocks 58 in place.

In a non-limiting exemplary embodiment, referring to FIGS. 4-5A and 9, a bottom end cap 60 is provided to securely simultaneously and frictionally fit in place at an open bottom end of the screen track 38*a* and an open bottom end of the first magnet channel 47. Such a frictional fit of the bottom end cap 60 prevents fluid and debris from entering the open bottom ends of the screen track 38*a* and first magnet channel 47, thereby preventing undesirable corrosion of the magnet 37

In a non-limiting exemplary embodiment, as explained above, the screen receiver 38 further includes a first magnet channel 47 configured to receive the first magnet 37 therein, and the bottom end cap 60 is removably connected to a bottom opening of the first magnet channel 47 and screen track 38*a*. Advantageously, screen pre-feeder 36 includes removably attached to the top opening of the first magnet channel 47. Bottom end cap 60 and bifurcated plug 77 prevent fluid and debris from entering the first magnet channel 47 thereby preventing undesirable corrosion of the magnets 37, 37*a*. Such a structural configuration yields the new, useful, and unexpected result of shielding the first magnet 37 from undesirable fluid and debris, which extends the useful life of the first magnet 37 by solving the problem of early magnet corrosion. Optionally, the first magnet 37 may be coated with vinyl and/or zinc for additional corrosion resistance.

In a non-limiting exemplary embodiment, base track 35 includes a plurality of end blocks 58 removably inserted into axially opposed open ends of the second magnet channel 48. End blocks 58 prevent fluid and debris from entering the second magnet channel 48, thereby preventing undesirable corrosion of magnet 37*a*. Such a structural configuration yields the new, useful, and unexpected result of shielding the second magnet 37*a* from undesirable fluid and debris, which extends the useful life of the second magnet 37*a* by solving the problem of early magnet corrosion. Optionally, the second magnet 37*a* may be coated with vinyl and/or zinc for additional corrosion resistance.

In a non-limiting exemplary embodiment, referring to FIGS. 11-11D, the screen pre-feeder 36 is an important part of a properly functioning automatic tensioning side track 34. Such a screen pre-feeder 36 provides a smooth transition into screen retaining C-channel 44 of the screen track 38*a*. Such a screen pre-feeder 36 includes a pair of spaced jam cleats 61 provided with a slot 62 therebetween, and to guide the beaded edge 31*a* of the screen as it goes down the C-channel 44 of screen track 38*a*. Such a jamming effect triggers (toggles) an electric motor (not shown) powering the screen 31 to stop. In windy situations where screen 31 is susceptible to being pulled out of the track 38*a* as it goes down, the jamming cleats 61 (resistive frictional force, jamming feature) causes the motor to stop operating and prevent screen bead 31*a* from disengaging the C-channel 44 of screen track 38*a*. Also, hole 79 receives a fastener to frictionally engage and separate bifurcated plug 77.

In a non-limiting exemplary embodiment, referring to FIGS. 11-11D, the aperture 64 has a downwardly converging chamfered edge 64*a* to funnel the screen into the screen track C-channel 44.

In a non-limiting exemplary embodiment, referring to FIGS. 11-11D, the screen pre-feeder 36 includes overhang protrusions 78 that is closely sized to the complimentary extruded screen receiver 38 so that the screen pre-feeder 36 does not shift position when engaged with the screen track 38*a* at the screen receiver 38.

Referring to FIGS. 1-20, disclosed is an automatic tensioning side track assembly 30 for maintaining a retractable screen 31 of a side track 34 at a desired tensioned state 33*a*. Such an automatic tensioning side track assembly 30 includes a stationary base track 35, a dynamic screen receiver 38 being adjustably engaged to the base track 35, a first magnet 37 being engaged with the dynamic screen receiver 38, a second magnet 37*a* being engaged with the stationary base track 35, and a screen 31 attached to the dynamic screen receiver 38. Such a screen receiver 38 is displaced along a vertical travel path 68 (during installation) and along a horizontal travel path 49 (when external forces are exerted against screen 31) registered orthogonal to the vertical travel path 68. Advantageously, the first magnet 37 is oppositely charged relative to the second magnet 37*a* and is configured to maintain an attractive magnetic force with the second magnet 37*a*. In this manner, the first magnet 37 is disposed at a first position 70 associated with a first rectilinear horizontal distance 71 away from the second magnet 37*a* when the screen 31 is at a substantially planar configuration and has a desired tensioned state 33*a*. Advantageously, the first magnet 37 is disposed at a second position 72 associated with a second rectilinear horizontal distance 73 away from the second magnet 37*a* when the screen 31 is at a substantially bowed configuration and has an undesired tensioned state 33. Advantageously, the first magnet 37 is configured to automatically return from the second position 72 to the first position 70 after the screen 31 is displaced to the substantially bowed configuration. The screen receiver 38 is dynamic relative to a stationary position of the base track 35. Such a structural configuration yields the new, useful, and unpredictable result of automatically returning the retractable screen 31 of a retractable screen enclosure 32 (e.g., patio) assembly 30 at a desired tensioned state 33*a* (e.g., no screen 31 sagging) after external shear and tension forces are exerted against the retractable screen 31 during ambient weather conditions and repetitive use over extended time periods.

As perhaps best shown in FIGS. 2-11D, an effective way to limit magnet corrosion is to seal the magnets 37, 37*a* within the magnet channels 47, 48 so that no water or air penetrates therein. In this way, no electrolytes are introduced, and corrosion does not have the necessary conditions to occur. Rather than having an open magnet channels 47, 48 (prior art), it is better to have closed channels 47, 48 that can be sealed to protect the magnets 37, 37*a* from corrosion, respectively. Closed magnet channels 47, 48 need only be sealed at their respective opposed ends which can be achieved by a water proof caulking, tight fitting end cap 60, bifurcated plug 77, blocks 58, or other similar features. Closed magnet channels 47, 48 that are sealed protect the magnets 37, 37*a* from damage and prevents corrosion thereby preserving the useful life of the magnets 37, 37*a* and allowing the automatic tensioning mechanism to last significantly longer.

In a non-limiting exemplary embodiment, the screen receiver 38 is disposed within the base track 35 when disposed at both the first position 70 and the second position 72. Thus, the screen receiver remains housed within base track 35 and only shifts along the bidirectional travel path 49.

In a non-limiting exemplary embodiment, the second magnet 37*a* is stationary relative to the stationary base track 35 and the dynamic first magnet 37. Advantageously, the first magnet 37 is reciprocated along the bi-directional travel path 49 starting at the first position 70 and at the first rectilinear horizontal distance 71, and terminating at the second position 72 and at the second rectilinear horizontal distance 73.

In a non-limiting exemplary embodiment, the screen receiver 38 includes the screen track 38*a* suitably sized and shaped for receiving an existing beaded screen edge 31*a*, and a screen pre-feeder 36 connected to a top opening of the screen track 38*a*. Advantageously, the screen pre-feeder 36 is configured to simultaneously travel with the screen receiver 38 between the first position 70 and the second position 72. This ensures that the first magnet channel 37*a* remains sealed from water and debris during repeated bidirectional and linear oscillating motions over extended time periods.

In a non-limiting exemplary embodiment, the first magnet 37 is positioned adjacent to screen track 38*a* and beneath screen pre-feeder 36.

In a non-limiting exemplary embodiment, the second magnet 37*a* is disposed laterally of the first magnet 37, and is oriented parallel thereto along their respective longitudinal lengths.

In a non-limiting exemplary embodiment, the screen receiver 38 includes a plurality of L-shaped prongs 46 seated within the base track 35 and abutted against interior side walls 35*a* of the base track 35.

In a non-limiting exemplary embodiment, base track 35 includes a plurality of pockets 51 disposed along the bi-directional travel path 49 of the L-shaped prongs 46. Such a structural configuration significantly reduces the requisite weight and side wall thickness of the base track 35 due to the unique L-shaped prongs 46 and pockets 51 of the present disclosure. In particular, the prior art (FIGS. 21, 22) requires a channel wall thickness of 0.08 inches used in high load applications, and a sleeve (which is required by the cited prior art) having a wall thickness of 0.25 inches placed over the channel making a combined wall thickness of 0.33 inches. This is a great increase in cost and complexity to have the additional parts to manufacture, store, and install and also there is the additional cost of the extra metal needed for the prior art sleeve (which is required by the cited prior art). Advantageously, the present disclosure provides the same or greater load capacity with much thinner side walls 35*a*. In particular, the present disclosure requires walls that have an overall thickness of only about 0.08 inches, but no outer sleeve (which is required by the cited prior art) is required to withstand the shear and tensile external forces from wind, objects, etc. Thus, the structural configuration of the present disclosure eliminates the need to have a sleeve (which is required by the cited prior art), which provides significant savings in material, costs, and installation labor.

In a non-limiting exemplary embodiment, the L-shaped prongs 46 are configured to releasably engage the pockets 51 as the screen receiver 38 is rectilinearly reciprocated along the bi-directional travel path 49 inside the base track 35.

In a non-limiting exemplary embodiment, the screen 31 is configured to be bowed at the undesired tensioned state 33 and when the L-shaped prongs 46 are engaged with the pockets 51.

In a non-limiting exemplary embodiment, the screen 31 is configured to be planar at the desired tensioned state 33*a* and when the L-shaped prongs 46 are disengaged and laterally displaced away from the pockets 51.

Finite Element Analysis

The extruded structural configuration of the automatic tensioning side track 34 was analyzed, via finite element analysis, to determine whether their respectively reduced cross-sectional thicknesses (reduced material costs) provide suitable strengths when the external shear and tension forces are exerted against the screen 31. The base track 35 and screen receiver 38 were analyzed with the screen 31 loaded at two different angles 0 and 45 degrees relative to an axis registered orthogonal between the two side tracks 34. During the analysis, base track 35 was simplified at its bottom to have a smaller data set for the analysis. The base track 35 was fixed on the bottom inside side wall 35*a*. For the test, a one inch sample length was used and a pull force of 150 lbf was applied to the face of the screen 31 to obtain forces applied to the gap in the screen tracks 38*a*. All of the parts were 6063-T6 aluminum. At a straight load, the stress was at the yield strength for the base track 35 thickness in some small areas that are not unique to the structure of the present disclosure. In other areas that are unique to the structure of the present disclosure (where the side walls can be thinned due to engagement of the L-shaped prongs 46 and pockets 51), the applied force is significantly below the yield strength. This indicates a substantially stronger side track 34 over prior art, which has to use additional reinforcing components to accomplish the same level of deformation resistance.

FIGS. 12-16 illustrate an alternate base track 35' and alternate screen receiver structural configurations 38'-38''' capable of yielding the same new, useful, and unexpected beneficial results of the present disclosure.

FIGS. 17-20 illustrate the structural configuration of conventional components employed by the present disclosure for providing a take up box 80 including a hood assembly, a screen take up reel 81 and associated motor 81*a*, and various weighted bars 82, 83 that may be affixed to the screen 31, which are all well-known components and operate in a well-known manner understood by one skilled in the art.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed as new and what is desired to secure by Letters Patent of the United States is:

1. An automatic tensioning side track assembly for maintaining a retractable screen of a retractable screen enclosure assembly at a desired tensioned state, said automatic tensioning side track assembly comprising:

a base track having a divider wall being configured to bifurcate said base track into a first section and a second section isolated therefrom;

a screen receiver being adjustably engaged to said base track and being positioned at a first side of said divider wall and entirely within said first section of said base track;

a first magnet being engaged with said screen receiver and positioned at said first side of said divider wall and entirely within said first section of said base track; and a second magnet being engaged with said base track and being positioned at a second side of said divider wall, opposite to said first side of said divider wall, and entirely within said second section of said base track;

said screen receiver being displaced only within said first section of said base track along a vertical travel path and along a horizontal travel path registered orthogonal to said vertical travel path;

wherein said first magnet is oppositely charged relative to said second magnet and is configured to maintain an attractive magnetic force with said second magnet;

at least one magnet channel located at one of said base track and said screen receiver;

wherein said at least one magnet channel has an outer wall continuously surrounding an entire perimeter of said at least one magnet channel.

2. The automatic tensioning side track assembly of claim 1, wherein said first magnet is disposed at a first position associated with a first rectilinear horizontal distance away from said second magnet when said screen is at a substantially planar configuration and has a desired tensioned state; wherein said first magnet is disposed at a second position associated with a second rectilinear horizontal distance away from said second magnet when said screen is at a substantially bowed configuration and has an undesired tensioned state; wherein said first magnet and said screen receiver each is disposed within said first section of said base track when said screen receiver is disposed at both said first position and said second position.

3. The automatic tensioning side track assembly of claim 2, wherein said second magnet and said at least one magnet channel each is stationary and disposed with said second section of said base track, said first magnet being reciprocated along a horizontal bi-directional travel path starting at said divider wall.

4. The automatic tensioning side track assembly of claim 1, wherein said screen receiver comprises: a plurality of prongs seated within said first section of said base track, wherein said base track includes a plurality of pockets seated within said first section of said base track and disposed along a travel path of said prongs, wherein said prongs are configured to releasably engage said pockets as said screen receiver is rectilinearly reciprocated along a horizontal bi-directional travel path inside said first section of said base track; wherein said prongs and said pockets are configured to prohibit said screen receiver from laterally exiting, along said horizontal bi-directional travel path, said first section of said base track.

5. The automatic tensioning side track assembly of claim 1, wherein said divider wall spans across an entire width of said base track.

6. The automatic tensioning side track assembly of claim 1, wherein said at least one magnet channel comprises:

a first magnet channel having a first outer wall continuously surrounding an entire perimeter of said first magnet channel and being disposed at said first section; and a second magnet channel having a second outer wall continuously surrounding an entire perimeter of said second magnet channel and being disposed at said second section.

7. The automatic tensioning side track assembly of claim 6, wherein said first magnet channel is located at said screen receiver; wherein said second magnet channel is located at said base track; wherein said divider wall is intercalated between said first magnet channel and said second magnet channel.

8. The automatic tensioning side track assembly of claim 1, wherein, when said screen receiver is tilted at an angle within said base track and relative to said divider wall, said screen receiver is prohibited from being inserted and removed from said base track.

9. An automatic tensioning side track assembly for maintaining a retractable screen of a retractable screen enclosure assembly at a desired tensioned state, said automatic tensioning side track assembly comprising:

a base track;

a screen receiver being engaged to said base track, wherein said screen receiver includes a first magnet channel having a first outer wall continuously surrounding an entire perimeter of said first magnet channel, a first feature configured to close a bottom opening of said first magnet channel, and a second feature configured to close a top opening of said first magnet channel; wherein said base track includes a second magnet channel having a second outer wall continuously surrounding an entire perimeter of said second magnet channel, third and fourth features configured to close axially opposed open ends of said second magnet channel;

a first magnet being engaged with said screen receiver and entirely hidden inside said first magnet channel; and a second magnet being engaged with said base track and entirely hidden inside said second magnet channel.

10. The automatic tensioning side track assembly of claim 9, wherein said screen receiver comprises: a plurality of prongs seated within said base track, wherein said base track includes a plurality of pockets disposed along a travel path of said prongs, wherein said prongs are configured to releasably engage said pockets as said screen receiver is reciprocated along a horizontal bi-directional travel path inside said base track; wherein said prongs and said pockets are configured to prohibit said screen receiver from laterally exiting, along said horizontal bi- directional travel path, said base track.

11. The automatic tensioning side track assembly of claim 9, wherein, when said screen receiver is tilted at an angle within said base track and relative to a vertical axis of said base track, said screen receiver is configured to be prohibited from being inserted and removed from said base track.

* * * * *